(12) United States Patent
Larsen et al.

(10) Patent No.: US 8,924,789 B2
(45) Date of Patent: Dec. 30, 2014

(54) SYSTEM AND METHOD FOR PROVIDING VIRTUAL MACHINE DIAGNOSTIC INFORMATION USING A FLIGHT RECORDER FUNCTIONALITY

(75) Inventors: Staffan Larsen, Stockholm (SE); Henrik Osterdahl, Stockholm (SE); Mikael Vidstedt, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 176 days.

(21) Appl. No.: 13/456,028

(22) Filed: Apr. 25, 2012

(65) Prior Publication Data

US 2013/0111273 A1 May 2, 2013

Related U.S. Application Data

(60) Provisional application No. 61/478,851, filed on Apr. 25, 2011.

(51) Int. Cl.
*G06F 11/00* (2006.01)
*G06F 11/34* (2006.01)

(52) U.S. Cl.
CPC ........ *G06F 11/3495* (2013.01); *G06F 2201/81* (2013.01); *G06F 2201/86* (2013.01); *G06F 11/3476* (2013.01); *G06F 2201/815* (2013.01)
USPC .......................................................... 714/33

(58) Field of Classification Search
USPC .................................................... 714/33, 45
See application file for complete search history.

(56) References Cited

U.S. PATENT DOCUMENTS

| | | | |
|---|---|---|---|
| 6,272,437 B1 | 8/2001 | Woods et al. | |
| 6,594,590 B2 | 7/2003 | Woods et al. | |
| 6,901,352 B2 | 5/2005 | Woods et al. | |
| 7,047,153 B2 | 5/2006 | Woods et al. | |
| 2003/0031353 A1* | 2/2003 | Baertsch et al. | 382/132 |
| 2004/0153823 A1 | 8/2004 | Ansari | |
| 2004/0236805 A1 | 11/2004 | Gordon | |
| 2004/0249914 A1 | 12/2004 | Flocken et al. | |
| 2005/0261875 A1 | 11/2005 | Shrivastava et al. | |
| 2005/0261878 A1 | 11/2005 | Shrivastava et al. | |
| 2005/0261879 A1 | 11/2005 | Shrivastava et al. | |
| 2005/0273490 A1 | 12/2005 | Shrivastava et al. | |
| 2005/0273667 A1 | 12/2005 | Shrivastava et al. | |
| 2007/0211739 A1 | 9/2007 | Schrock | |
| 2007/0220361 A1* | 9/2007 | Barnum et al. | 714/45 |
| 2008/0091982 A1* | 4/2008 | Bartlett et al. | 714/45 |
| 2011/0107003 A1 | 5/2011 | Kang et al. | |
| 2012/0159248 A1* | 6/2012 | Inamdar et al. | 714/25 |

* cited by examiner

*Primary Examiner* — Yair Leibovich
(74) *Attorney, Agent, or Firm* — Meyer IP Law Group

(57) ABSTRACT

A system and method for providing virtual machine diagnostic information. In accordance with an embodiment, a "flight recorder", for use with a virtual machine, such as a Java virtual machine (JVM), allows a system administrator, software developer or other user experiencing a system problem to "go back in time" and analyze what happened right before a particular problem occurred in their system, and/or obtain an extremely detailed level of profiling without impacting system performance. The flight recorder does this by being tightly integrated into the core of the JVM itself, and by being very conscious of its performance overhead. This allows the flight recorder to provide a large amount of information on the inner workings of the JVM, and on Java programs running in the JVM.

20 Claims, 7 Drawing Sheets

```
JFR_EVENT(VMMutexEnter,
    "vm/mutex/enter",
    "JVM mutex enter",
    "Entering JVM level mutex",
    HAS_THREAD HAS_STACKTRACE,
  JFR_VALUE(UTF8,   name,  "Mutex name")
  JFR_VALUE(THREAD, holder, "Holding thread",
    "Thread preventing mutex enter")
  JFR_TRANSITION_VALUE(FROM,
    THREAD, last, "Last holder"
    )
)
```
230

FIGURE 5

```
JFR_BEGIN_EVENT(VMMutexEnter);

... DO STUFF

JFR_END_EVENT(VMMutexEnter,
    JFR_SET(name, lock->name)
    JFR_SET(holder, holder)
    JFR_SET(last, unlocker)
    )
```
234

FIGURE 6

```
JFR_SEND_TIMED_EVENT(CompileOpt,
    start, end,
    JFR_SET(method, m)
)
```
238

FIGURE 7

```
JFR_SEND_INSTANT_EVENT(GCModeChange,
    JFR_SET(from, gcGetCurrentMode())
    JFR_SET(to, mode)
    JFR_SET(reason, "New mode requested by external API")
);
```
242
FIGURE 8
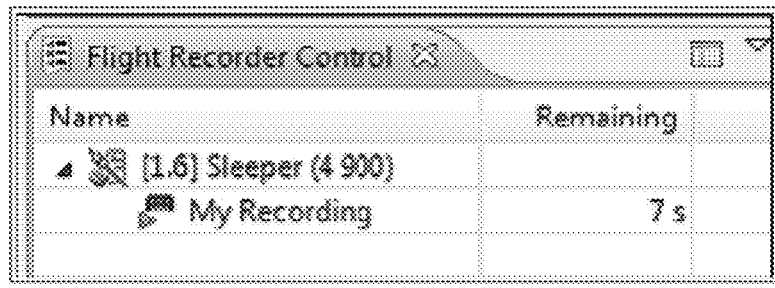
246
FIGURE 9
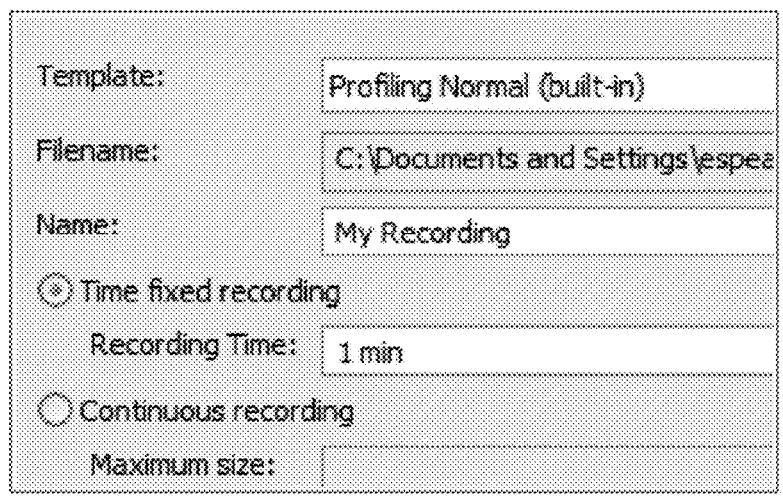
250
FIGURE 10

SYSTEM AND METHOD FOR PROVIDING VIRTUAL MACHINE DIAGNOSTIC INFORMATION USING A FLIGHT RECORDER FUNCTIONALITY

CLAIM OF PRIORITY

This application claims the benefit of priority to U.S. Provisional Patent Application titled "SYSTEM AND METHOD FOR PROVIDING VIRTUAL MACHINE DIAGNOSTIC INFORMATION USING A FLIGHT RECORDER FUNCTIONALITY", Application No. 61/478,851, filed Apr. 25, 2011, which application is incorporated herein by reference.

CROSS-REFERENCE TO RELATED APPLICATIONS

This application is related to U.S. patent application titled "DIAGNOSTIC FRAMEWORK FOR USE WITH APPLICATION SERVERS AND VIRTUAL MACHINES", application Ser. No. 13/111,612, filed May 19, 2011, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to virtual machines, such as Java virtual machines, and is particularly related to a system and method for providing virtual machine diagnostic information using a flight recorder functionality.

BACKGROUND

A virtual machine, such as a Java virtual machine (JVM), allows for portability of software applications between different underlying computer architectures, hardware platforms, and operating systems. Examples of JVMs include Oracle JRockit, and Oracle Hotspot. In the context of an application server environment, such as Oracle WebLogic Server, the JVM provides a uniform layer of abstraction between the hardware platform and the application server or any compiled software applications running thereon. An important aspect of any such environment is the ability to identify problems that may manifest at the application level down to any underlying issues in the application server and/or virtual machine.

SUMMARY

Disclosed herein is a system and method for providing virtual machine diagnostic information. In accordance with an embodiment, a "flight recorder", for use with a virtual machine, such as a Java virtual machine (JVM), allows a system administrator, software developer or other user experiencing a system problem to "go back in time" and analyze what happened right before a particular problem occurred in their system, and/or obtain an extremely detailed level of profiling without impacting system performance. The flight recorder does this by being tightly integrated into the core of the JVM itself, and by being very conscious of its performance overhead. This allows the flight recorder to provide a large amount of information on the inner workings of the JVM, and on Java programs running in the JVM.

BRIEF DESCRIPTION OF THE FIGURES

FIGS. 5-8 show example event definitions, including begin/end event, timed event, and instant event, in accordance with an embodiment.

FIGS. 9-11 show an example of a mission control client user interface for use with the flight recorder, in accordance with an embodiment.

DETAILED DESCRIPTION

As described above, an important aspect of any environment that includes an application server and a virtual machine is the ability to identify problems that may manifest at the application level, down to any underlying issues in the virtual machine. To address this, disclosed herein is a system and method for providing virtual machine diagnostic information. In accordance with an embodiment, a "flight recorder" (referred to herein in some instances as "JRockit Flight Recorder", "Java Flight Recorder", or "Flight Recorder"), for use with a virtual machine, such as a Java virtual machine (JVM), allows a system administrator, software developer or other user experiencing a system problem to "go back in time" and analyze what happened right before a particular problem occurred in their system, and/or obtain an extremely detailed level of profiling without impacting system performance.

In accordance with an embodiment, the flight recorder does this by being tightly integrated into the core of the virtual machine itself, and by being very conscious of its performance overhead. This allows the flight recorder to provide a large amount of information on the inner workings of the virtual machine, and on applications (e.g., Java programs) running in the virtual machine. A user can then utilize this information for profiling, and for root cause analysis of problems with the system or with software applications running thereon. Furthermore, the flight recorder can be enabled at all times, without causing performance overhead, even in a heavily loaded, live production environment.

In accordance with an embodiment, the flight recorder can be tightly integrated into, e.g., an Oracle Fusion Middleware or Oracle WebLogic family of application server products, to provide a full stack view of such a system. This allows for collection of diagnostically-important information to be made available to the user, both at a high-level regarding components such as Java servlets and database executions, and also at a lower-level including fine-grained information on thread synchronization and garbage collections. Additional information describing the use of flight recorder with a WebLogic application server environment is provided in U.S. Patent Application titled "DIAGNOSTIC FRAMEWORK FOR USE WITH APPLICATION SERVERS AND VIRTUAL MACHINES", application Ser. No. 13/111,612, filed May 19, 2011.

Figure 1:
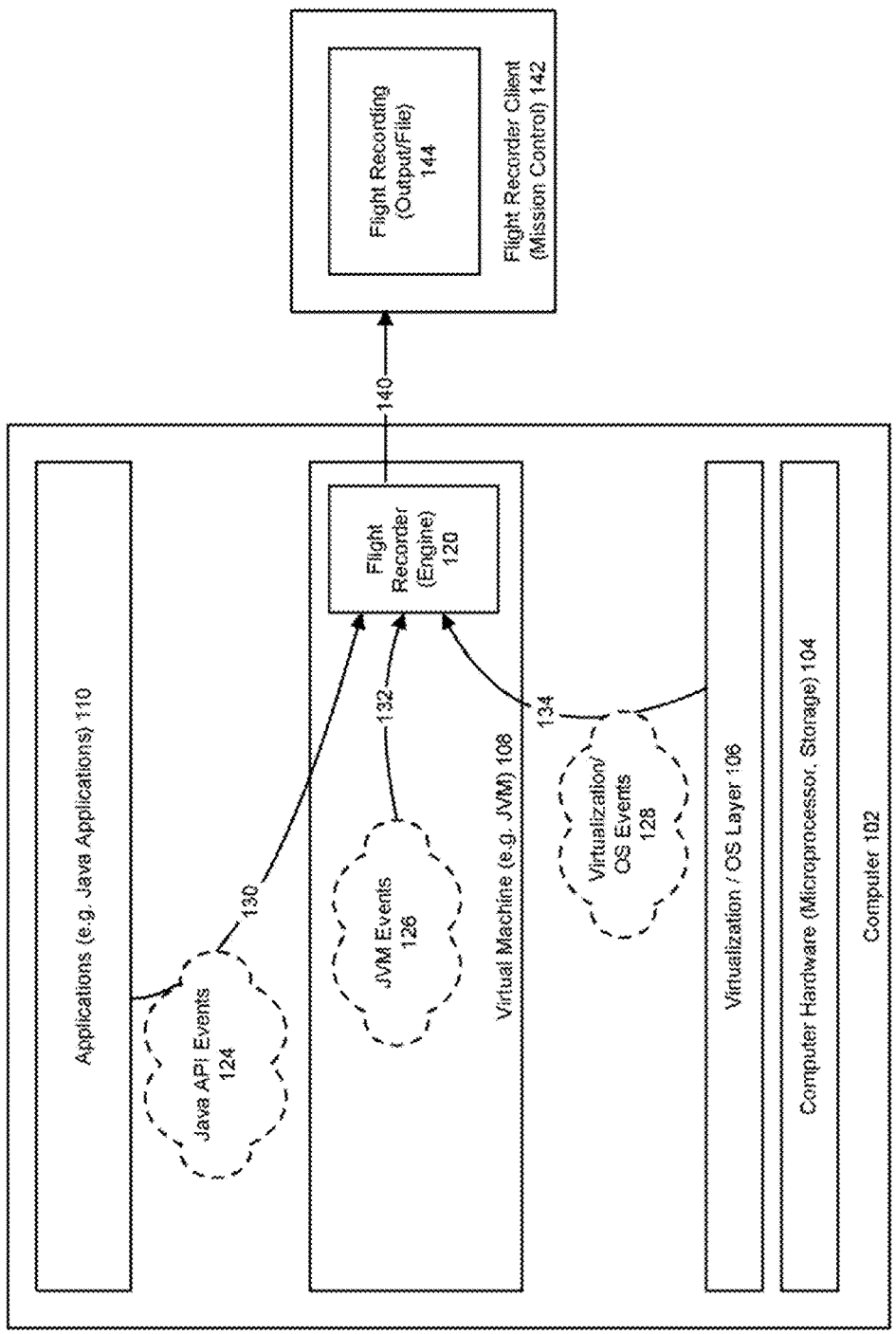
FIG. 1 shows an illustration of a system for providing virtual machine diagnostic information, in accordance with an embodiment.

FIG. 1 shows an illustration of a system for providing virtual machine diagnostic information, in accordance with an embodiment. As shown in FIG. 1, in accordance with an embodiment, the system comprises a computer 102, which includes computer hardware (e.g., a microprocessor, storage, etc) 104, a virtualization or operating system (OS) layer 106, and a virtual machine (e.g., a JVM) 108, for use in executing one or more software applications 110. The flight recorder environment combines two functionalities: a flight recorder engine 120, which sits inside the virtual machine and records data regarding the operation of the virtual machine and applications; and a flight recorder client (referred to herein in some instances as a "mission control" client) 142, which can be used to review the recorded data as diagnostic information.

During execution of the applications running on the computer, the flight recorder engine receives event inputs 130, 132, 134 from one or more event sources, such as Java API events 124, JVM events 126, and virtualization/OS events 128, and combines or merges several of these input events (e.g., by merging application events with JVM events) into a coordinated, ordered stream, for subsequent use in outputting diagnostic information 140 to the mission control client.

For example, in accordance with an embodiment, virtualization/OS events can be provided as input to the flight recorder from the operating system, or from other processes such as information from the virtualization layer used to run the virtual machine or information such as scheduling decisions by the operating system. In accordance with an embodiment, the system can use a communication channel such as that described in U.S. Patent Application titled "SYSTEM AND METHOD TO IMPROVE MEMORY USAGE IN VIRTUAL MACHINES RUNNING AS HYPERVISOR GUESTS", application Ser. No. 12/205,467, filed Sep. 5, 2008, and subsequently published as U.S. Publication No. 2009/007077 and which is incorporated herein by reference, to communicate information to and from the virtual machine.

Additional examples of the types of input information which can be received by the flight recorder engine include network congestion and resends on the TCP/IP level, InfiniBand communication problems and efficiencies, and networked file system problems.

In accordance with an embodiment, the flight recorder engine produces an output that includes diagnostic information, e.g., as a "flight recording" file 144, which can be later analyzed by the user using the mission control client.

Flight recorder functionality is useful in a variety of ways including, by way of example, Profiling: because the flight recorder continuously saves large amounts of data about the running system, it can operate as a profiler. Profiling information can include thread samples, which show where the program spends its time, as well as lock profiles and garbage collection details; "Black Box" Problem Analysis: the flight recorder can operate as a "black box," similar to an airplane "black box", continuously saving information to a circular buffer. This information then can be accessed whenever an anomaly is detected, which can be essential to quickly finding performance issues in a deployed system; and Support/Debugging: the fight recorder can be used to provide information that a support engineer (e.g., an Oracle support personnel) can recognize as important clues for diagnosing issues with the system and/or software.

Figure 2:
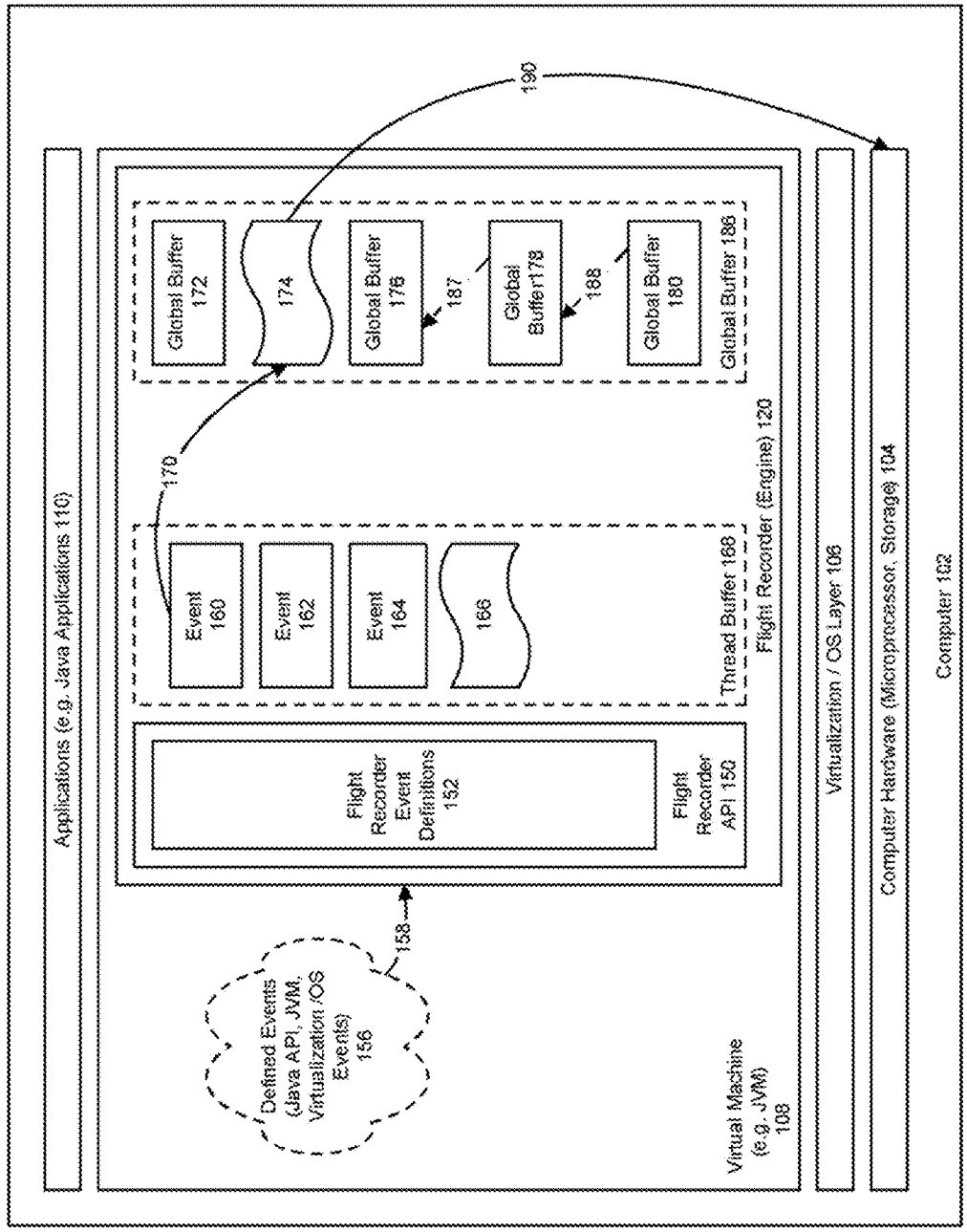
FIG. 2 shows another illustration of a system for providing virtual machine diagnostic information, in accordance with an embodiment.

FIG. 2 shows another illustration of a system for providing virtual machine diagnostic information, in accordance with an embodiment. As shown in FIG. 2, the flight recorder can be configured such that, instead of writing events to disk immediately as they occur, the flight recorder instead stores the event data within the virtual machine's hierarchy of in-memory buffers, and then move the data to disk when these buffers fill.

In accordance with an embodiment, the flight recorder includes an application program interface (API) 150 that is configured according to a plurality of event definitions 152, so that the API can recognize different event types. As recognized events 156 are received 158 at the flight recorder, initially the flight recorder puts the received event data 160, 162, 164, 166 into the virtual machine's thread-local buffers 168, which eliminates the need to synchronize between threads for every event and greatly improves throughput. When a thread-local buffer has been filled, the data is transferred 170 to global buffer entries 172, 174, 176, 178, 180 within a global buffer (including pointers 187, 188 between the global buffer entries where appropriate). When this occurs, synchronization is necessary between the threads but, because different thread-local buffers fill up at different rates, lock contention is rare. Eventually, the global buffer will itself run out of space, at which point its contents can be written 190 to a disk or other form of storage. Since writing to disk is expensive, it is preferable if this happens as seldom as possible. The information stored on disk can be stored as a flight recording file, for later analysis using the mission control client.

Flight Recorder Events

As described above, in accordance with an embodiment, the flight recorder includes an API that is configured according to a plurality of event definitions so that the API recognizes different event types. This allows a user, such as a system administrator or developer, to register additional types of events with the API, e.g., additional Java API event types, so that those events can be recognized by the flight recorder and used in creating diagnostic information.

Figure 3:
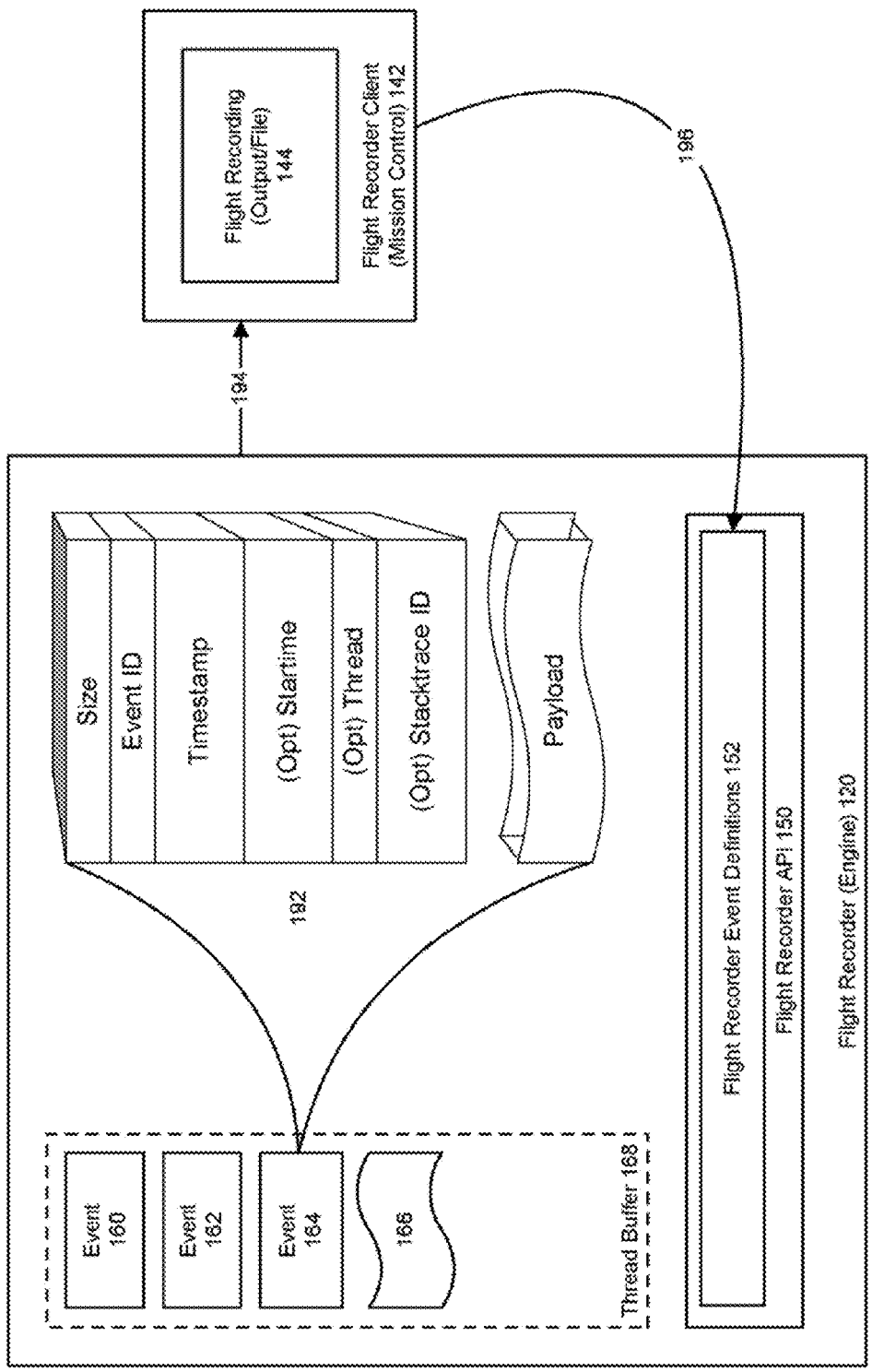
FIG. 3 shows an illustration of an event data associated with an event type, in accordance with an embodiment.

FIG. 3 shows an illustration of an event data, in accordance with an embodiment. As shown in FIG. 3, each event 190 has a name, a time stamp, and an optional payload. In accordance with an embodiment, the payload depends on the type of the event. For example, the payload for an old collection event, generated by the garbage collector, may be the heap size before and after the collection; while the payload of an event to signal that a thread has been blocked by a lock may be the thread ID of the lock holder.

In accordance with an embodiment, in addition to name and time stamps, most events also have information on the thread in which the event occurred, the stack trace at the time the event was captured, and the duration of the event (in some instances with nanosecond precision). Requestable events are those events that the recording engine can poll with a certain frequency, the simplest example of this being the CPU load event—a user can configure the recording engine to poll for this event once every second. By using the information available in an event, the flight recorder can provide output 194 to reconstruct in detail what happened during program execution.

Since, as described above, all of the events pass through the thread buffer and are time-stamped, application events such as HTTP GET can be associated with corresponding virtual machine/JVM events such as WAIT READ. This allows the flight recorder to present an accurate view of related events as they occur within the stack, which provides more useful information to user. One of the principles underlying the flight recorder is that every piece of data it captures is an event, wherein an event is something that happens in a running application at a specific point in time.

In accordance with an embodiment, events from the virtual machine and from a Java application can be merged so they are stored in the same queue, and so they can be correlated with one another from the highest-level down to the lowest lock taking. For example, in a web application environment, a web request may trigger an event. When the web request is answered with a response, it triggers a second event. The system can determine not only how long the request took to process, but also all of the things that happened within the system in processing the request. The system can also include explicit support for event relations, e.g., that a web request has a database query associated with it, which allows the information to be reported on the related actions. In accordance with an embodiment, event producers can use fields to tag different types of event with information that can be used to associate events together (e.g., a URI, or a transaction ID), and then find all other events that occurred within a particular timeframe or the same thread. In accordance with an embodiment, the system can determine that events that occur within a same timeframe and same thread are probably related, and utilize this knowledge in preparing the diagnostic output.

Events Processing

Figure 4:
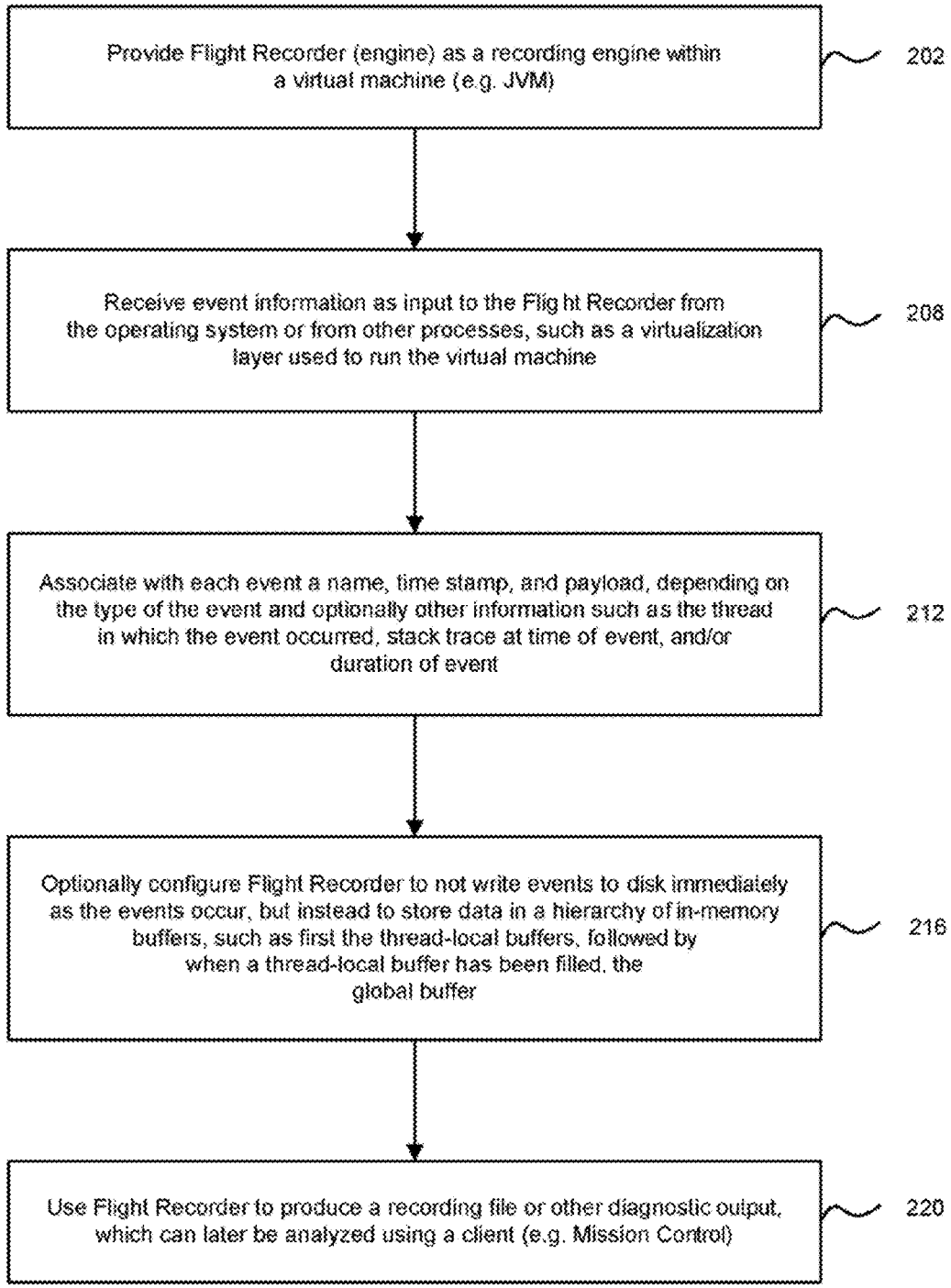
FIG. 4 shows a flowchart of a method for providing virtual machine diagnostic information, in accordance with an embodiment.

FIG. 4 shows a flowchart of a method for providing virtual machine diagnostic information, in accordance with an embodiment. As shown in FIG. 4, at step 202, a flight recorder (engine) is provided as a recording engine within a virtual machine (e.g., a JVM). At step 208, event information is received as input to the flight recorder from the operating system or from other processes such as a virtualization layer used to run the virtual machine. At step 212, each event is associated with a name, time stamp, and payload, depending on the type of event and optionally other information such as the thread in which the even occurred, stack trace, at time of event, and/or the duration of the event. At step 216, the flight recorder can be optionally configured to not write events to disk immediately as the events occur, but instead to stored the data in a hierarchy of in-memory buffers, such as first the thread-local buffers, followed by, when a thread-local buffer has been filled, the global buffer. At step 220, the flight recorder can be used to produce a recording file or other diagnostic output, which can be later analyzed using a client (e.g., the mission control client).

Event Types

Examples of the different event types which can be recorded by flight recorder include miscellaneous informational events, Java and JVM synchronization events, Java and JVM thread events, file and socket I/O events, class loading/unloading/GC events, codegen/opt events, and GC/MM/Allocation events. In accordance with an embodiment, the system also allows the user to declare new event types, for example by modifying an jfr_events_declare.h file, which in turn modifies the flight recorder API. Macros can be provided to assist in this process. Complex events, such as arrays, may require producing binary data by hand. The Java API allows for other systems, such as other Oracle products to produce events, which can then be identified and recorded by the flight recorder. FIGS. 5-8 show example event definitions, including begin/end event 230, 234, timed event 238, and instant event 242, in accordance with an embodiment.

Flight Recorder Performance

In accordance with an embodiment, the flight recorder is designed to keep its own overhead as low as possible. Testing has shown that when default settings are used, performance impact can be less than one percent. Since the flight recorder is able to monitor the running system at an extremely high level of detail, this produces an enormous amount of data that is costly to handle. Accordingly, one approach to improved performance is limiting the amount of data to just that information relevant to the current profiling run. In accordance with an embodiment, the flight recorder filters data as early as possible to maintain low overhead. This can be done two different ways: First, by limiting which type of events are actually captured, the user can control this information in detail when they start the recording; Second, by only recording events with durations exceeding a certain threshold, then in most cases, very short events are not of any interest and can be discarded. This effectively limits the amount of data the flight recorder must handle. If the user wants to capture more data, they can change the threshold.

Flight Recordings

In accordance with an embodiment, the flight recording file is created in a proprietary, binary format that is both extremely compact, efficient for the applications to read from and write to, and includes metadata that allows the flight recording file to be self-describing and easily rendered.

Circular Buffering

In accordance with other embodiments, a user can configure the flight recorder so that it does not write any data to disk. Instead, in this mode, the global buffer acts as a circular buffer, with its oldest flight recorded data being dropped when the buffer becomes full. This very low-overhead operating mode still collects all of the vital data necessary for root-cause problem analysis—since the most recent data is always available in the global buffer, it can be written to disk upon demand whenever operations or surveillance systems detect a problem.

Flight Recorder Command-Line and Other Options

In accordance with an embodiment, the flight recorder can be configured through the use of command-line options, a console, or a combination thereof. Depending on the particular embodiment, some aspects of the flight recorder may only be configurable at virtual machine startup, while others may be (re)configurable at later times. Examples of configurable aspects include buffer size, repository location, and continuous recording settings. Examples of command-line configuration options in accordance with an embodiment include those shown below:

```
-XX: +FlightRecorder enables flight recorder (JFR)
-XX: -FlightRecorder disables flight recorder (JFR)
-XX: FlightRecorderOptions=<comma separated opts>
    settings=<string> - default settings file, may occur multiple times
    repository=<string> - disk repository location
    threadbuffersize=<size> - default: 5kB
    globalbuffersize=<size> - default: 64 kB
    numglobalbuffers=<size> - default: 8 buffers
    maxchunksize=<s8> - default: 12 MB
    continuous=<bool> - background recording(on)
    disk=<bool> - use disk for cont (default: off)
    maxage=<time> - max age for continuous
    maxsize=<s8> - max size for continuous
-XX: StartFlightRecording=<comma separated opts>
    Equivalent to start_jfr_recording diagnostic command
```

It will be evident that the above examples are provided for purposes of illustration, and that, in accordance with other embodiments, different examples of configurable aspects and/or command-line options can be provided.

Parallel Recording

In accordance with an embodiment, parallel recordings can be made without extra effort. Every recording has its own event settings, and the actual data is the set of all enabled events in the running recordings. A recording is stored as one or more chunks—every chunk is independent, and chunks can be merged to a single .jfr file. In accordance with various embodiments, chunks can also be streamed over JMX, and the flight recorder can perform background recordings to RAM or to disk.

Flight Recorder Client (Mission Control)

Figure 11:
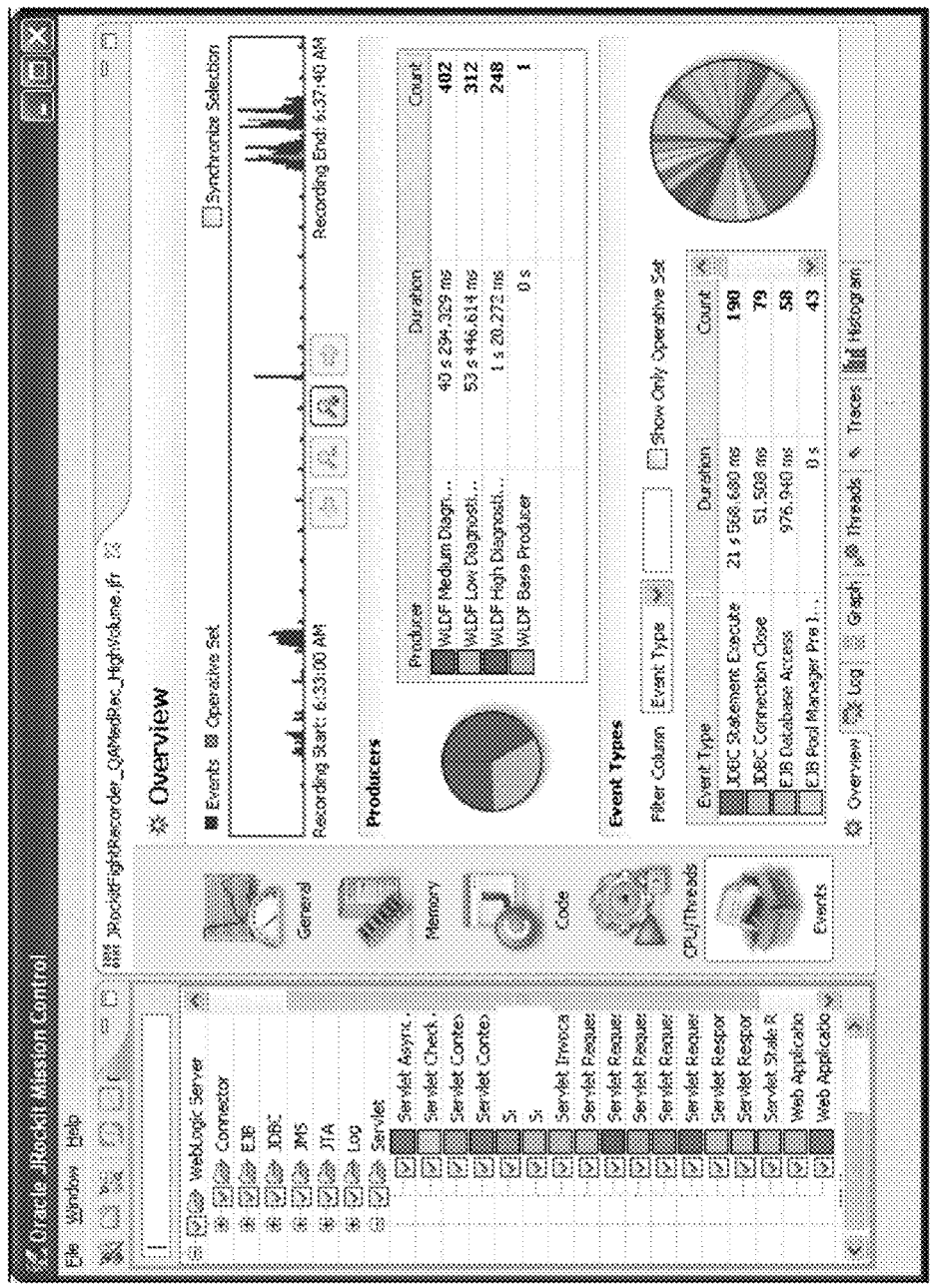
Figure 2:
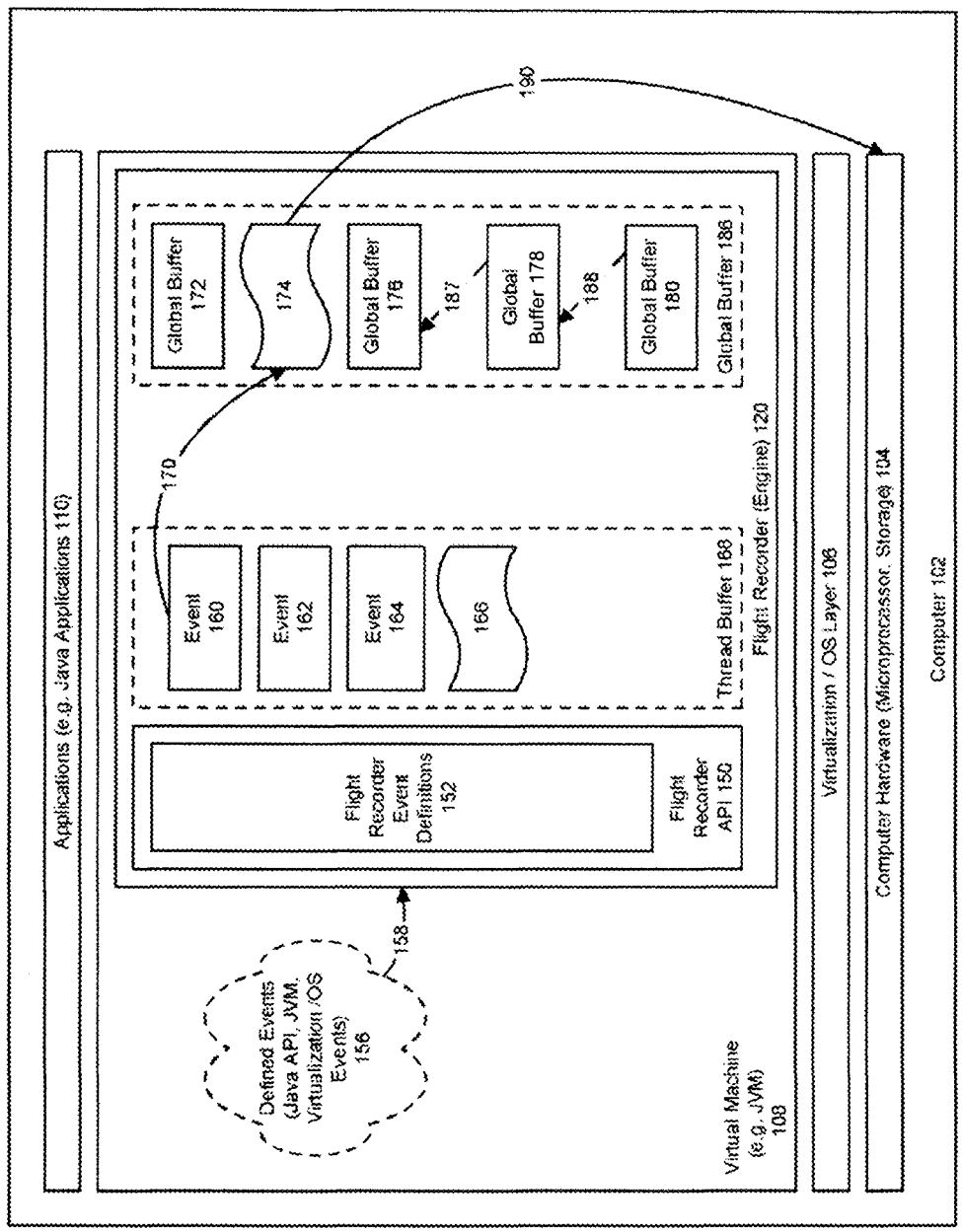
Figure 4:
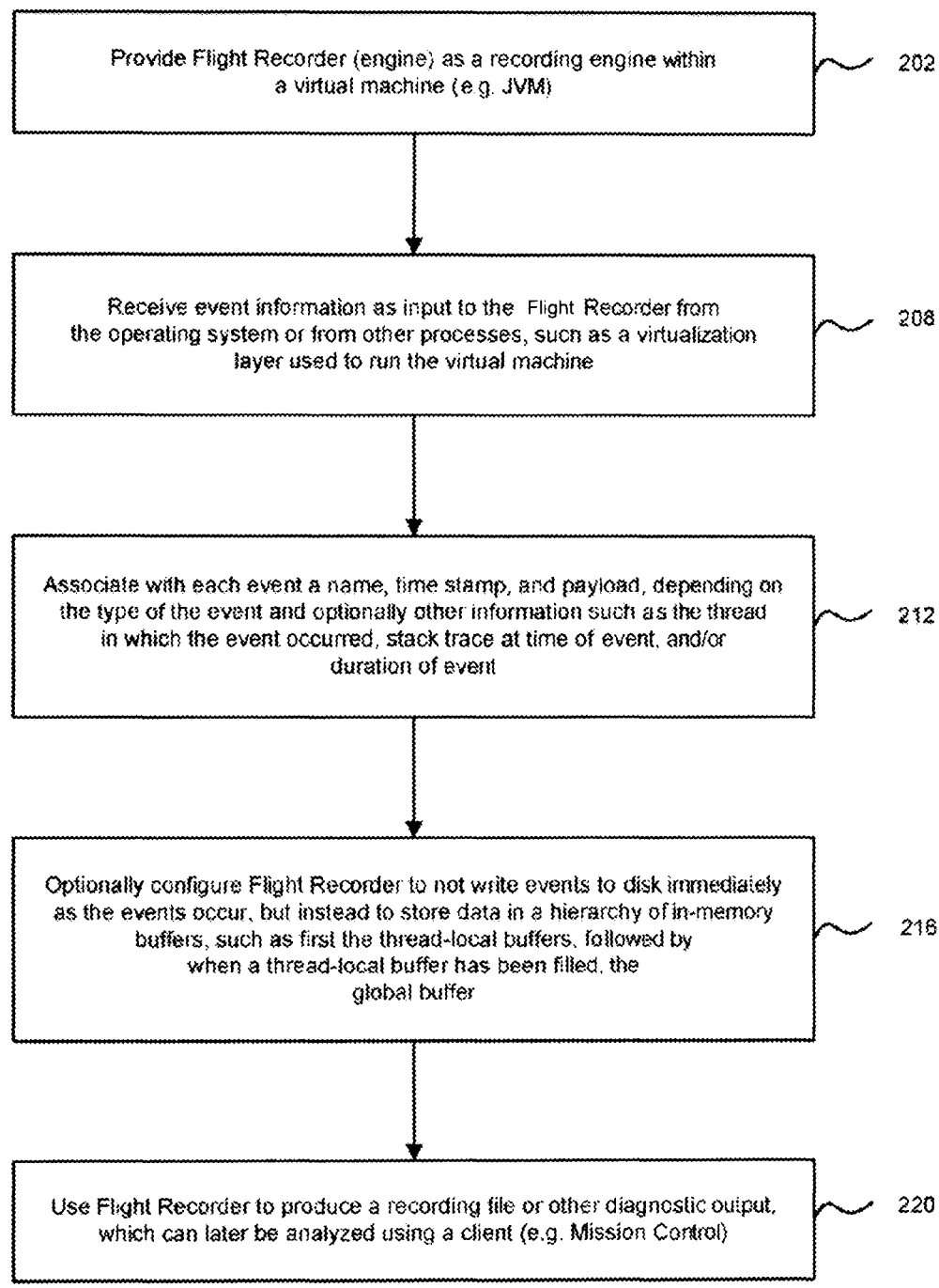

In accordance with an embodiment, the user can control the flight recorder, and recording process, including reviewing diagnostic information provided by the flight recorder, using the mission control client, which provides a tools suite that the user can use to monitor, manage, profile, and eliminate memory leaks in their applications, without introducing the performance overhead normally associated with these types of tools. FIGS. 9-11 show an example of a mission control client user interface 246, 250, 260 for use with the flight recorder, in accordance with an embodiment.

The present invention may be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

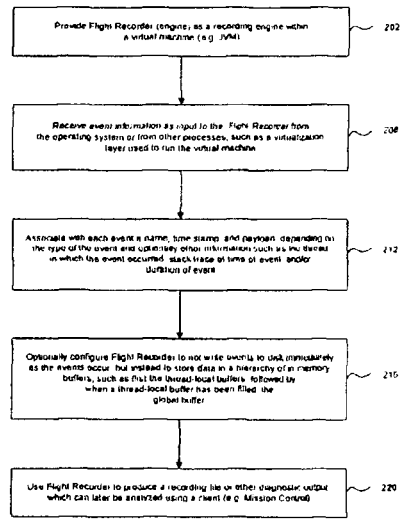

What is claimed is:

1. A system for providing virtual machine diagnostic information, comprising:
   a computing or virtual execution environment which includes one or more computers having one or more microprocessor, and a virtual machine, for use in executing one or more software applications; and
   a flight recorder engine provided in the virtual machine that operates with the virtual machine to
      record recognized events as event data regarding the operation of the virtual machine and the applications executing thereon, wherein, as recognized events are received at the flight recorder engine, initially the flight recorder engine records event data in the virtual machine's thread-local buffers, and then, when a thread-local buffer has been filled, transfers the event data to a global buffer, and
      provide the event data from the global buffer as a coordinated ordered stream of data, for use in determining or analyzing virtual machine or application problems.

2. The system of claim 1, further comprising a flight recorder client which is used to review recorded event data as diagnostic information.

3. The system of claim 2, wherein the global buffer is configured as a circular buffer wherein older event data is dropped when the global buffer is full and wherein recent event data is persisted as the coordinated ordered stream of data when a problem is detected.

4. The system of claim 1, wherein recognized event types are defined by event type definitions which define an application program interface for the flight recorder engine, and wherein the event type definitions, and the recognized event types, can be modified by a user to modify which events regarding operation of the virtual machine are recognized events tracked by the flight recorder and used in creating the diagnostic information.

5. The system of claim 1, wherein during execution of the applications on the virtual machine, the flight recorder engine receives recognized events from one or more sources, and combines several of the recognized events into the event data.

6. The system of claim 1, wherein, when the global buffer is filled, the event data recorded in the global buffer is written to disk.

7. The system of claim 1, wherein the event data comprises a name of each recognized event and a time stamp for each recognized event.

8. The system of claim 1, wherein the recognized events include requestable events which the flight recorder engine can poll at a configurable interval.

9. A method for providing virtual machine diagnostic information in a computing or virtual execution environment which includes one or more computers and a virtual machine for use in executing one or more software applications, the method comprising the steps of:
   providing a flight recorder engine configured to receive input events regarding the operation of the virtual machine and the applications executing;
   recording, with the flight recorder engine, recognized events as event data, in thread-local buffers of the virtual machine;
   transferring the event data from the thread-local buffers to a global buffer when thread-local buffers are full; and
   providing the event data from the global buffer as a coordinated ordered stream of data, for use in determining or analyzing virtual machine or application problems.

10. The method of claim 9, further comprising:
    providing a flight recorder client; and
    receiving the coordinated ordered stream of data with the flight recorder client for use in determining or analyzing virtual machine or application problems.

11. The method of claim 9, further comprising:
    configuring the global buffer as a circular buffer;
    dropping older event data from the global buffer when the global buffer is full; and
    storing recent event data remaining in the global event data as the coordinated ordered stream of data when a problem is detected.

12. The method of claim 9, further comprising:
    providing an application programming interface for the flight recorder engine which defines recognized event type and recognized the event type definitions wherein the recognized event types and recognized event type definitions and are configurable by a user to modify which input events regarding operation of the virtual machine and one or more applications are recognized events recorded by the flight recorder engine and used for creating the diagnostic information.

13. The method of claim 9, further comprising:
writing the event data recorded in the global buffer to disk when the global buffer is full.

14. The method of claim 9, wherein the event data comprises a name of each recognized event and a time stamp for each recognized event.

15. The method of claim 9, wherein the recognized events include requestable events which the flight recorder engine can poll at a configurable interval.

16. A non-transitory computer readable medium including instructions stored thereon for providing virtual machine diagnostic information in a computing or virtual execution environment which includes one or more computers and a virtual machine for use in executing one or more software applications, which instructions, when read and executed by a computer, cause the computer to perform steps comprising:
providing a flight recorder engine configured to receive input events regarding the operation of the virtual machine and the applications executing;
recording, with the flight recorder engine, recognized events as event data, in thread-local buffers of the virtual machine;
transferring the event data from the thread-local buffers to a global buffer when thread-local buffers are full; and
providing the event data from the global buffer as a coordinated ordered stream of data, for use in determining or analyzing virtual machine or application problems.

17. The non-transitory computer readable medium of claim 16, including further instructions stored thereon which when read and executed by a computer, cause the computer to perform steps further comprising:
configuring the global buffer as a circular buffer;
dropping older event data from the global buffer when the global buffer is full; and
storing recent event data remaining in the global event data as the coordinated ordered stream of data when a problem is detected.

18. The non-transitory computer readable medium of claim 16, including further instructions stored thereon which when read and executed by a computer, cause the computer to perform steps further comprising:
providing an application programming interface for the flight recorder engine which defines recognized event type and recognized the event type definitions wherein the recognized event types and recognized event type definitions and are configurable by a user to modify which input events regarding operation of the virtual machine and one or more applications are recognized events recorded by the flight recorder engine and used for creating the diagnostic information.

19. The non-transitory computer readable medium of claim 1, including further instructions stored thereon which when read and executed by a computer, cause the computer to perform steps further comprising:
writing the event data recorded in the global buffer to disk when the global buffer is full.

20. The non-transitory computer readable medium of claim 16, wherein the recognized events include requestable events which the flight recorder engine can poll at a configurable interval.

\* \* \* \* \*

UNITED STATES PATENT AND TRADEMARK OFFICE
CERTIFICATE OF CORRECTION

| | | |
|---|---|---|
| PATENT NO. | : 8,924,789 B2 | Page 1 of 4 |
| APPLICATION NO. | : 13/456028 | |
| DATED | : December 30, 2014 | |
| INVENTOR(S) | : Larsen et al. | |

It is certified that error appears in the above-identified patent and that said Letters Patent is hereby corrected as shown below:

The title page showing the illustrative figure should be deleted to be replaced with the attached title page.

In the Drawings
Drawing sheets, consisting of Figs. 2 and 4, should be deleted to be replaced with the drawing sheets, consisting of Figs. 2 and 4, as shown on the attached pages.

In the Specification
In column 5, line 38, delete "stored" and insert -- store --, therefor.

In the Claims
In column 10, lines 22-23, in Claim 19, delete "claim 1," and insert -- claim 16, --, therefor.

Signed and Sealed this
Eighth Day of September, 2015

Michelle K. Lee
*Director of the United States Patent and Trademark Office*

(12) United States Patent
Larsen et al.

(10) Patent No.: US 8,924,789 B2
(45) Date of Patent: Dec. 30, 2014

(54) SYSTEM AND METHOD FOR PROVIDING VIRTUAL MACHINE DIAGNOSTIC INFORMATION USING A FLIGHT RECORDER FUNCTIONALITY

(75) Inventors: Staffan Larsen, Stockholm (SE); Henrik Osterdahl, Stockholm (SE); Mikael Vidstedt, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 176 days.

(21) Appl. No.: 13/456,028

(22) Filed: Apr. 25, 2012

(65) Prior Publication Data

US 2013/0111273 A1    May 2, 2013

Related U.S. Application Data

(60) Provisional application No. 61/478,851, filed on Apr. 25, 2011.

(51) Int. Cl.
*G06F 11/00*    (2006.01)
*G06F 11/34*    (2006.01)

(52) U.S. Cl.
CPC ........ *G06F 11/3495* (2013.01); *G06F 2201/81* (2013.01); *G06F 2201/86* (2013.01); *G06F 11/3476* (2013.01); *G06F 2201/815* (2013.01)
USPC ............................................................ 714/33

(58) Field of Classification Search
USPC .................................................. 714/33, 45
See application file for complete search history.

(56) References Cited

U.S. PATENT DOCUMENTS

| | | |
|---|---|---|
| 6,272,437 B1 | 8/2001 | Woods et al. |
| 6,594,590 B2 | 7/2003 | Woods et al. |
| 6,901,352 B2 | 5/2005 | Woods et al. |
| 7,047,153 B2 | 5/2006 | Woods et al |
| 2003/0031353 A1 * | 2/2003 | Baertsch et al. ........... 382/132 |
| 2004/0153823 A1 | 8/2004 | Ansari |
| 2004/0236805 A1 | 11/2004 | Gordon |
| 2004/0249914 A1 | 12/2004 | Flocken et al. |
| 2005/0261875 A1 | 11/2005 | Shrivastava et al. |
| 2005/0261878 A1 | 11/2005 | Shrivastava et al. |
| 2005/0261879 A1 | 11/2005 | Shrivastava et al. |
| 2005/0273490 A1 | 12/2005 | Shrivastava et al. |
| 2005/0273667 A1 | 12/2005 | Shrivastava et al. |
| 2007/0211739 A1 | 9/2007 | Schrock |
| 2007/0220361 A1 * | 9/2007 | Barnum et al. ............. 714/45 |
| 2008/0091982 A1 * | 4/2008 | Bartlett et al. ............. 714/45 |
| 2011/0107003 A1 | 5/2011 | Kang et al. |
| 2012/0159248 A1 * | 6/2012 | Inamdar et al. ............ 714/25 |

* cited by examiner

*Primary Examiner* — Yair Leibovich
(74) *Attorney, Agent, or Firm* — Meyer IP Law Group

(57) ABSTRACT

A system and method for providing virtual machine diagnostic information. In accordance with an embodiment, a "flight recorder", for use with a virtual machine, such as a Java virtual machine (JVM), allows a system administrator, software developer or other user experiencing a system problem to "go back in time" and analyze what happened right before a particular problem occurred in their system, and/or obtain an extremely detailed level of profiling without impacting system performance. The flight recorder does this by being tightly integrated into the core of the JVM itself, and by being very conscious of its performance overhead. This allows the flight recorder to provide a large amount of information on the inner workings of the JVM, and on Java programs running in the JVM.

20 Claims, 7 Drawing Sheets